US009783260B2

(12) United States Patent
Broussard

(10) Patent No.: US 9,783,260 B2
(45) Date of Patent: Oct. 10, 2017

(54) ADJUSTABLE REAR WHEEL HOOD BRAKE/STOP SYSTEM FOR FREE STYLE KICK SCOOTERS

(71) Applicant: Andrew Broussard, Vista, CA (US)

(72) Inventor: Andrew Broussard, Vista, CA (US)

( * ) Notice: Subject to any disclaimer, the term of this patent is extended or adjusted under 35 U.S.C. 154(b) by 0 days.

(21) Appl. No.: 14/575,348

(22) Filed: Dec. 18, 2014

(65) Prior Publication Data

US 2016/0176470 A1 Jun. 23, 2016

(51) Int. Cl.
| B62M 1/00 | (2010.01) |
| B62L 3/04 | (2006.01) |
| B62K 3/00 | (2006.01) |
| B62L 1/04 | (2006.01) |
| B62J 15/02 | (2006.01) |

(52) U.S. Cl.
CPC ............. B62L 3/04 (2013.01); B62J 15/02 (2013.01); B62K 3/002 (2013.01); B62L 1/04 (2013.01)

(58) Field of Classification Search
CPC ...... B62L 1/06; B62L 1/00; B62L 1/02; B62L 1/005; B62L 1/04; B62L 3/04; B62L 3/00; B62K 3/002; B62K 23/00; B62K 23/08
See application file for complete search history.

(56) References Cited

U.S. PATENT DOCUMENTS

| 6,139,035 | A * | 10/2000 | Tsai ........................... B62L 1/04 280/11.201 |
| 6,286,632 | B1 * | 9/2001 | Chai ........................... B60T 1/04 188/19 |
| 6,305,698 | B1 * | 10/2001 | Liang ..................... B62K 3/002 280/655.1 |
| 6,352,270 | B1 * | 3/2002 | Wu ......................... B62K 3/002 188/19 |
| 6,364,070 | B1 * | 4/2002 | Chen ....................... B62K 3/002 188/19 |
| 6,481,728 | B2 * | 11/2002 | Chen ....................... B62K 3/002 188/19 |
| 8,813,892 | B2 * | 8/2014 | Hadley ................... F16D 49/00 180/220 |
| 9,010,776 | B2 * | 4/2015 | Elliott .................... B62K 3/002 280/87.021 |
| 9,586,643 | B2 * | 3/2017 | McCormick ......... B62K 15/006 |
| 9,592,876 | B2 * | 3/2017 | Lovley, II ............. B62K 3/002 |
| 9,610,998 | B1 * | 4/2017 | LaBonty .................. B62K 5/08 |
| 9,616,961 | B2 * | 4/2017 | Wright ................... B62K 3/002 |
| 9,638,285 | B2 * | 5/2017 | Huang ................. B60K 7/0007 |
| 9,643,679 | B2 * | 5/2017 | Desberg .................. B62K 5/06 |
| 2002/0020980 | A1 * | 2/2002 | Lee ........................ B62K 3/002 280/87.041 |

(Continued)

*Primary Examiner* — James M Dolak

(74) *Attorney, Agent, or Firm* — Jonathan A. Kidney; TechLaw LLP

(57) ABSTRACT

An adjustable rear wheel hood system has a movable hood, so to be longitudinally adjusted to accommodate shrinking wheels (due to wear), or other requirements. A longitudinal slot is aligned between the rear wheel hood and the deck, and after adjusting the hood-to-rear wheel separation to a desired amount, the hood is secured to the deck. Either the deck or hood is configured with the slot, while the other piece has holes and/or alignment features that align the pieces together, provide a way to secure the pieces together, and also prevent lateral movement of the hood. A similarly configured adjustable non-braking rear hood is described.

20 Claims, 11 Drawing Sheets

(56) References Cited

U.S. PATENT DOCUMENTS

| | | | | |
|---|---|---|---|---|
| 2002/0067014 A1* | 6/2002 | Heringer | ............... | B60T 1/04 |
| | | | | 280/87.041 |
| 2002/0117825 A1* | 8/2002 | Ho | ............... | B62K 3/002 |
| | | | | 280/87.041 |
| 2008/0203691 A1* | 8/2008 | Hsu | ............... | B60T 1/04 |
| | | | | 280/87.041 |
| 2012/0061931 A1* | 3/2012 | Floyd | ............... | B60T 1/04 |
| | | | | 280/87.041 |

* cited by examiner

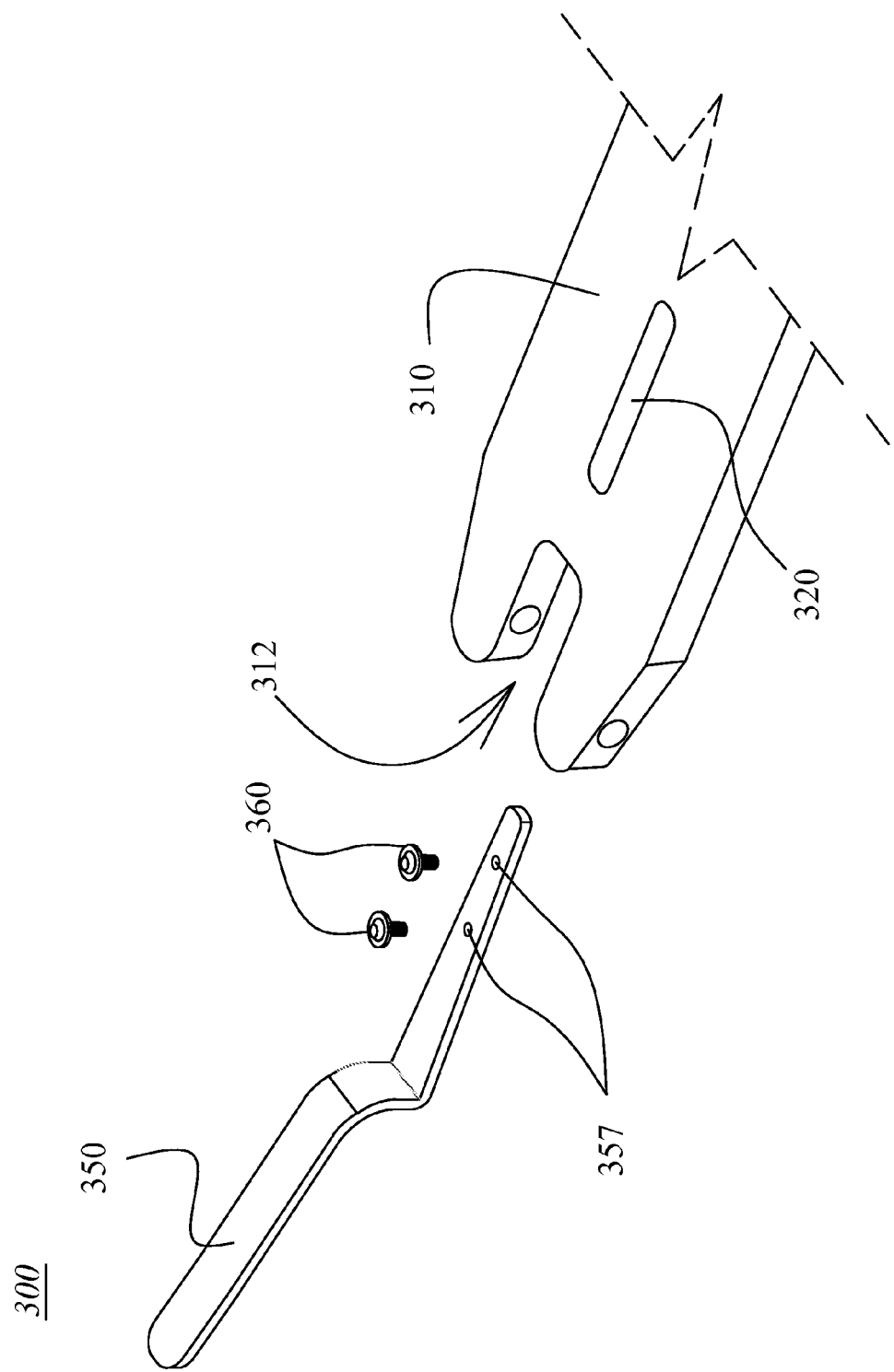

ADJUSTABLE REAR WHEEL HOOD BRAKE/STOP SYSTEM FOR FREE STYLE KICK SCOOTERS

FIELD

This invention relates to kick scooters. More particularly, this invention relates to an adjustable rear wheel hood system for use in free style kick scooters.

BACKGROUND

Kick scooters are "braked" by the application of foot pressure on the top of a fixed flexible hood situated over the rear wheel. The hood is a piece of resilient metal flanged to the scooter deck, and when pressed by the rider's heel/foot causes the underside of the hood to touch the rear wheel. The ensuing friction on the rotating rear wheel operates to slow the scooter. The hood is fixed to the scooter deck via a cantilevered flange joint, using a single bolt/nut combination or a series of bolt/nut combinations.

Currently, as the wheel's rubber/surface wears, the hood-to-wheel distance increases and the rider compensates for the reduced reaction by pressing harder/further on the hood. Since the hood is fixed to a pre-designated position (through the factory drilled hole in the deck), there is no opportunity to adjust for wheel wear or for personal preference on brake response. Also, in some instances it may not be desirable to have a brake.

Accordingly, in view of the above deficiencies, methods and systems are presented below that allow for customized positioning of the rear hood to allow improved consumer satisfaction and increased performance.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a free style kick scooter adjustable rear wheel hood system is provided, comprising: securing mechanisms; a free style kick scooter deck having a longitudinal slot having at least one or more widths is disposed at a rear of the scooter deck configured to mate to a braking hood; and a braking hood constructed of a resilient material, having a front end and a rear end, the rear end being elevated from the front end and configured to apply braking force to a rear wheel when pressure is applied to a top side portion of the rear end, the front end having a plurality of longitudinally spaced securing receptacles configured to mate with the securing mechanisms, wherein the longitudinal slot enables adjustment of a mating position of the braking hood on the scooter deck to affect a braking response, and wherein the securing mechanisms, when mated and secured, prevent the braking hood from lateral or rotational movement on the scooter deck.

In other aspects of the disclosed embodiments, the adjustable rear wheel hood system described above is provided, wherein the plurality of longitudinally spaced securing receptacles are holes and the securing mechanisms are at least one of threaded bolts, washers, and nuts; and/or wherein the holes are threaded; and/or wherein the threaded bolts are permanently attached to the securing receptacles; and/or wherein the front end's plurality of longitudinally spaced securing receptacles are a first hole and an elevated protuberance, and the securing mechanisms is a threaded bolt fitting the first hole; and/or the elevated protuberance is a bolt threaded or welded to a second hole spaced from and longitudinally in line with the first hole; and/or wherein the elevated protuberance is a rivet through a second hole spaced from and longitudinally in line with the first hole; and/or wherein the elevated protuberance is a welded or glued pin spaced from and longitudinally in line with the first hole; and/or wherein the elevated protuberance is a pressed or hammered dimple spaced from and longitudinally in line with the first hole; and/or wherein the elevated protuberance is a pressed or hammered ridge spaced from and longitudinally in line with the first hole; and/or wherein the elevated protuberance is a bent tang spaced from and longitudinally in line with the first hole; and/or further comprising a spring coupling the front end to the rear end, wherein the front and rear ends are separable pieces; and/or wherein the rear end is not resilient and does not provide braking force to the rear wheel when pressure is applied to the top side portion of the rear end; and/or wherein the rear end extends laterally to an approximate width of the scooter deck; and/or wherein the rear or the front end is formed using a casting, injection molding, 3D printing, forging, or extrusion technique; and/or wherein the rear wheel braking hood is formed using a casting, injection molding, 3D printing, forging, or extrusion technique; and/or wherein the longitudinal slot is disposed at a bottom surface of the deck; and/or wherein the rear wheel braking hood is mounted to an interior surface of the deck.

BRIEF DESCRIPTION OF THE DRAWINGS

FIG. 3A is a closeup illustration of a brake side end of a deck having one embodiment of an exemplary adjustable rear wheel hood system.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

The following illustrations typify an exemplary adjustable rear wheel hood embodiment which can change the brake response distance, to be adjusted to accommodate shrinking wheels (due to wear). It should be understood that this ability is significant for scooter riders that "train" on their scooters, understanding that they develop finely tuned muscle memory as to how the brake responds for a given stunt. When a new wheel is installed with a slightly different diameter or the wheel wears down quickly, the rider must re-train his muscle memory/reflexes for the altered wheel. Using embodiments described herein, it is believed the rider can immediately maintain his same skill level without having to retrain his body.

In various embodiments, a longitudinal slot is aligned between the rear wheel hood and the deck, and after adjusting the hood-to-rear wheel separation to a desired amount, the hood is secured to the deck. Holes and/or alignment features are describe that align the pieces together, provide a way to secure the pieces together, and also prevent lateral or rotational movement of the hood. A similarly configured adjustable non-braking rear hood is described. Also, embodiments are described where the rear wheel hood provides a non-braking barrier between the rider's foot and the rear wheel—an aspect desirable for initiating wheelies, tricks or stunts involving balance without reducing speed, etc.

Figure 1:
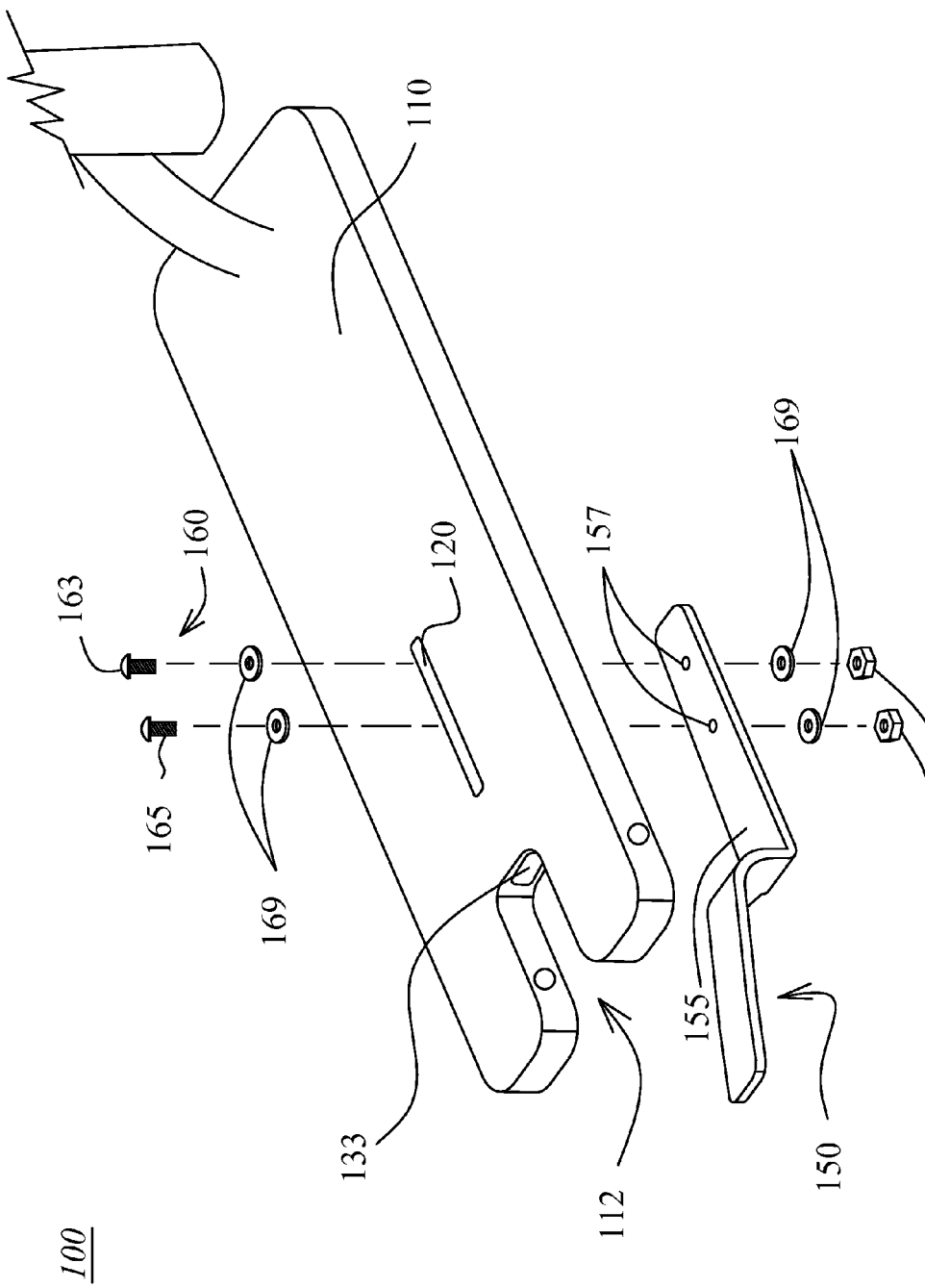
FIG. 1 is an exploded top view illustration of an embodiment of an exemplary adjustable rear wheel hood system for a free style kick scooter.

FIG. 1 is an exploded top view illustration of an embodiment 100 of an exemplary adjustable rear wheel hood system for a free style kick scooter. Deck 110 has the standard rear cutout 112 for the rear wheel assembly (not shown). The term fender or hood will be used interchangeably, recognizing that some persons may consider a covering over the wheel as a "fender" or "hood" and, therefore either term may be used with no loss of understanding, in the context of its use.

Adjustable rear wheel hood system comprises fender 150 with wheel contact rear section 152 displaced from mounting flange front section 155. These sections may also be generically referred to as rear end (152) and front end (155). In operation, fender 150 is fitted through cutout 112 and its flange section 155 is attached via one or more releasable longitudinally spaced securing mechanisms or elements 160 (shown here in a non-limiting embodiment as screws or a threaded bolt) to deck 110, via longitudinal slot 120 situated in deck 110 and respective longitudinally spaced securing receptacles 157 found in flange section 155. These longitudinally spaced securing receptacles 175 may also be generically referred to as hole(s) 157, or as a combination of a securing receptacle and alignment feature, as further described below.

To avoid interference with the rider's foot, securing element(s) 160 are typically, but not necessarily, designed with a lower profile head or other non-interfering head 163. For this same reason, fender 150 is usually not fitted to the top of deck 110, but either fitted through opening 133 in the body of the deck 110, or to bottom of deck 110. However, it is contemplated that in some embodiments, a configuration of fender 150 may be designed to allow top-mounting to deck 110 and therefore, these modified embodiments are understood to be within the purview of one of ordinary skill in the art.

Continuing with the embodiment shown in FIG. 1, slot 120 is sized wide enough to allow arm 165 of securing element(s) 160 to slide through slot 120, while keeping head 163 from sliding through. Of course, an optional washer or other intermediary restriction 169 may be used, if so desired, to permit smaller headed securing element(s) 160, or for better gripping effects in this or any embodiment described below.

A user can adjust the longitudinal position of fender 150 along deck 110, if first loosely coupling securing element(s) 160 to fender 150 through hole(s) 157 in fender 150, and then precisely customizing the position of fender 150 to the rear wheel (not shown). Once the desired position is found, the user can "lock" securing element(s) 160 to deck 110 using a nut or other mating securing mechanism 167. It should be noted that a plurality of securing element(s) 160 are typically used to ensure that fender 150 does not laterally shift or rotate about the securing element 160 (if only using one securing element). One or more securing element(s) 160 may be obviated by use of an alignment feature in fender 150, as further discussed below.

In one embodiment, fender hole(s) 157 may be one or more holes, depending on implementation preference. For example, only a single hole 157 may be needed if fender 150 contains an alignment feature. Further, fender hole(s) 157 may be threaded or non-threaded. If fender hole(s) 157 is threaded, then there will be no need for mating securing mechanism 167 (e.g., nut) on the end of arm 165 of securing element(s) 160. Thus, a user can make adjustments solely from the "top" of the deck 110, and only need one tool—tightening securing element(s) 160 directly to fender 150. If fender hole(s) 157 is not threaded, requiring a nut or other mating securing mechanism 167, then an additional tool (to hold the nut/securing mechanism 167) will be required and the user will have to use both hands to adjust and tighten fender 150 to deck 110. Of course, a nut/securing mechanism that does not require a tool can be used. For ease of operation, in a commercial embodiment, fender hole(s) 157 is threaded to obviate this requirement, thus only a single tool is needed—on the head 163 of securing mechanism(s) 160.

Figure 2:
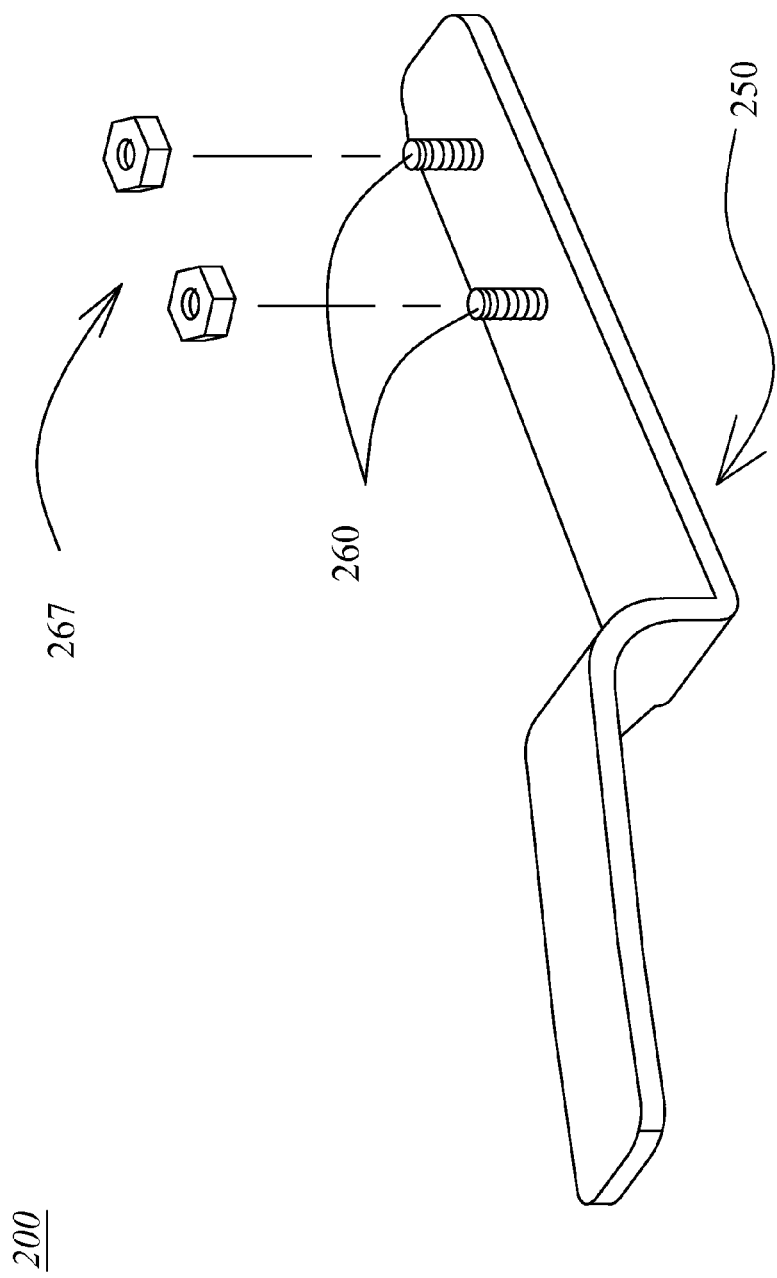
FIG. 2 is an illustration of an embodiment of an exemplary adjustable rear wheel hood system wherein the securing element(s) is permanently fixed to the fender.

FIG. 2 is an illustration 200 of another exemplary embodiment of a fender 250, wherein securing element(s) 260 is permanently fixed to the fender 250. Nut or other mating securing mechanism 267 is attached to fix the fender 250 to the slotted deck (as seen in FIG. 1). The operation of this embodiment is self-explanatory.

FIG. 3A is a closeup illustration 300 of the rear wheel side end of an exemplary deck 310 having a rear wheel hood system. Fender 350 with holes 357 having threads are fitted through rear brake cutout 312, in alignment with deck slot 320. Securing mechanisms (illustrated here in a non-limiting example as screws/bolts with washers) 360 are inserted through the slot 320 and tightened to the threads of fender holes 357.

Figure 3B:
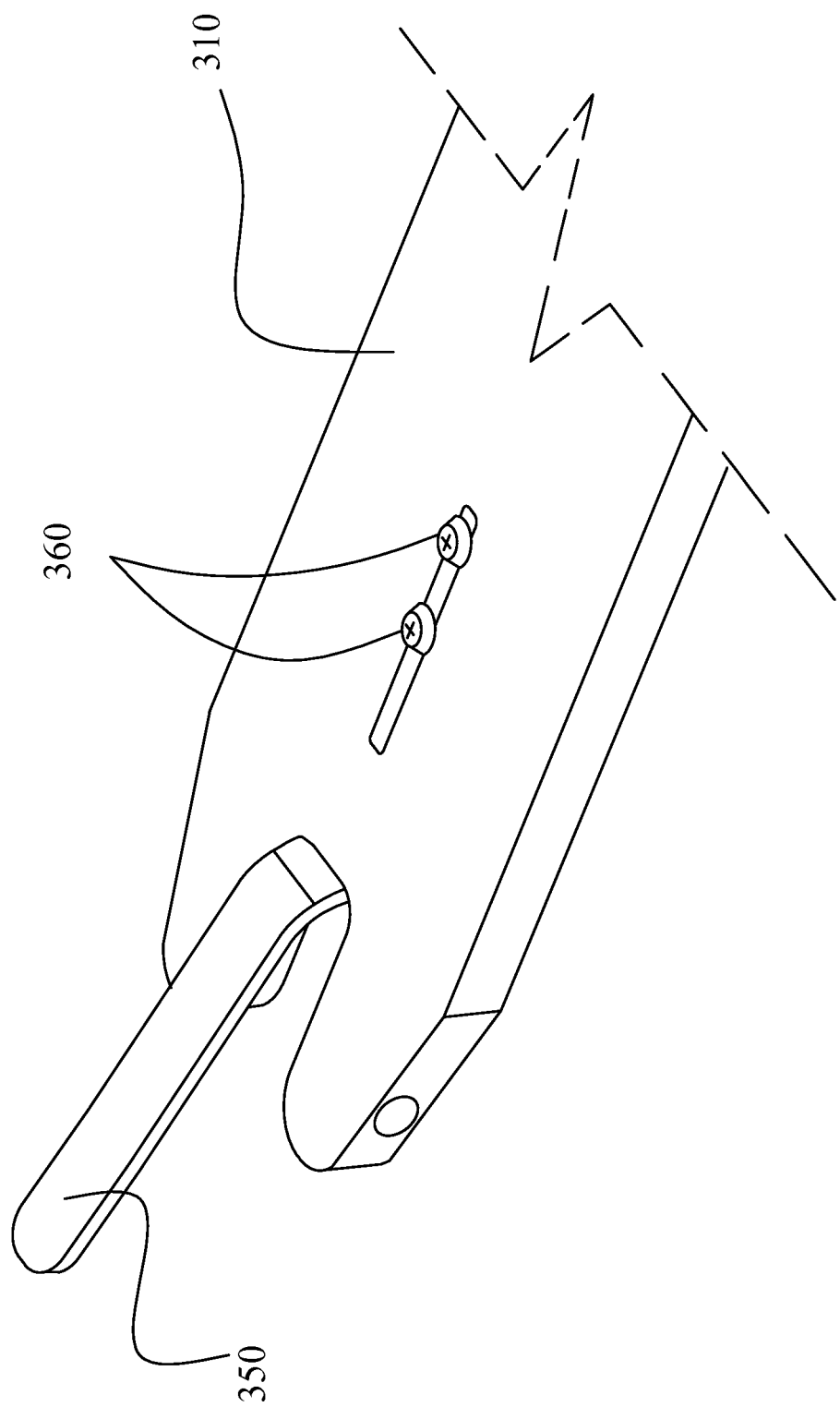
FIG. 3B is an illustration of an assembled and mounted exemplary adjustable rear wheel hood system to a scooter deck.

As shown in FIG. 3B, a user can adjust the longitudinal positioning of the fender 350 via "sliding" the fender 350 along slot 320 to a desired position and tightening securing mechanisms 360.

Figure 3C:
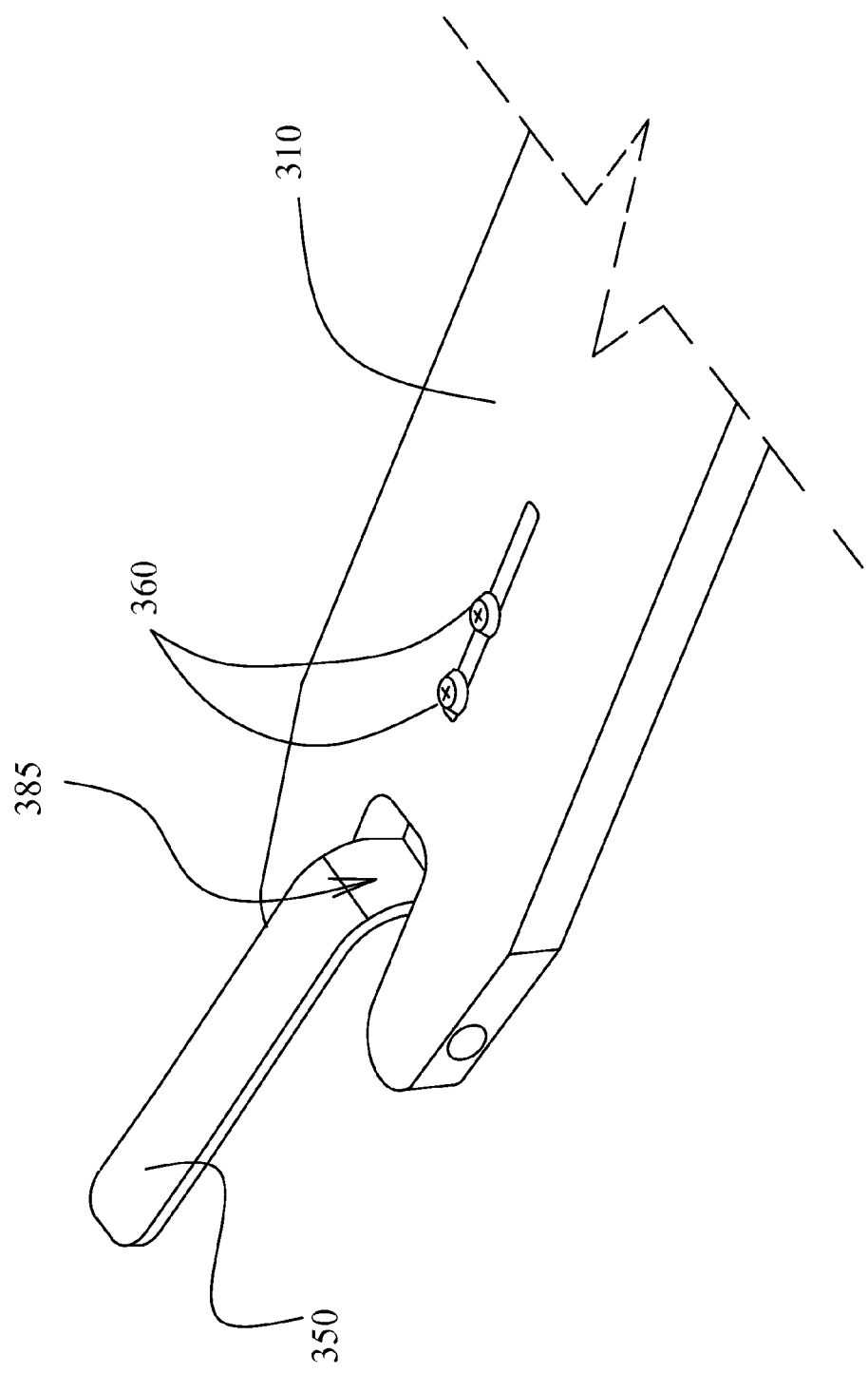
FIG. 3C is another illustration of an assembled and mounted exemplary adjustable rear wheel hood system with a different separation.

FIG. 3C is another illustration of an assembled embodiment of FIG. 3A, however it is noted, looking at gap 385, that fender 350 is displaced longitudinally further from deck 310 than in FIG. 3B. FIGS. 3A-C show the variability of positioning the fender 350 which can be achieved.

Figure 3D:
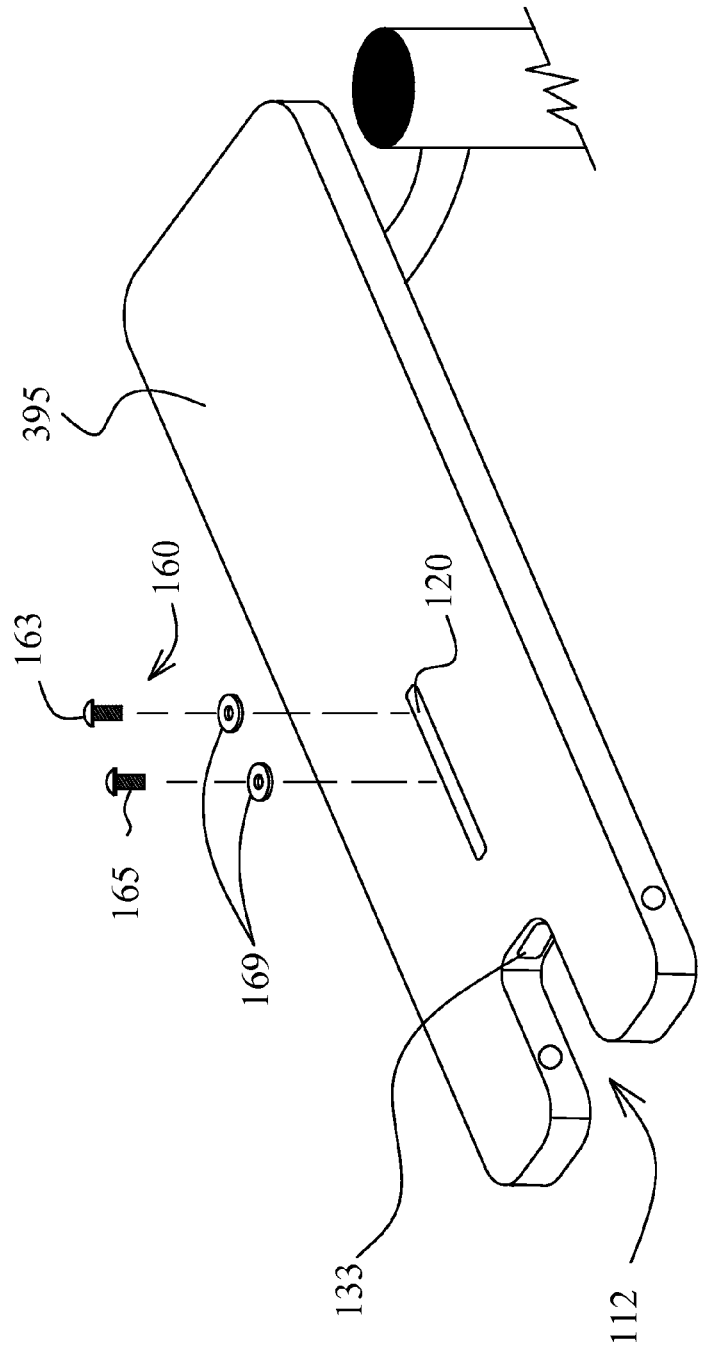
FIG. 3D is another illustration of the bottom side of a deck having a slot for the exemplary adjustable rear wheel hood system.

FIG. 3D is another illustration 390 showing another embodiment, wherein the bottom side of deck 395 has a slot 120 for the exemplary adjustable rear wheel hood system. It is noted that deck 395 can also have opening 133 wherein the hood (not shown) can be inserted therein to an interior surface and attached to deck 395 via securing element(s) 160 which slide through slot 120, with optional intermediary restriction/washer 169. While securing element(s) 160 are shown, it is possible that they may be disposed from the "opposite" side of deck 395, and attached via a nut or other mating securing mechanism. In other embodiments, the hood can be attached to the bottom and exterior of deck 395, rather than through opening 133, if so desired.

Figure 4:
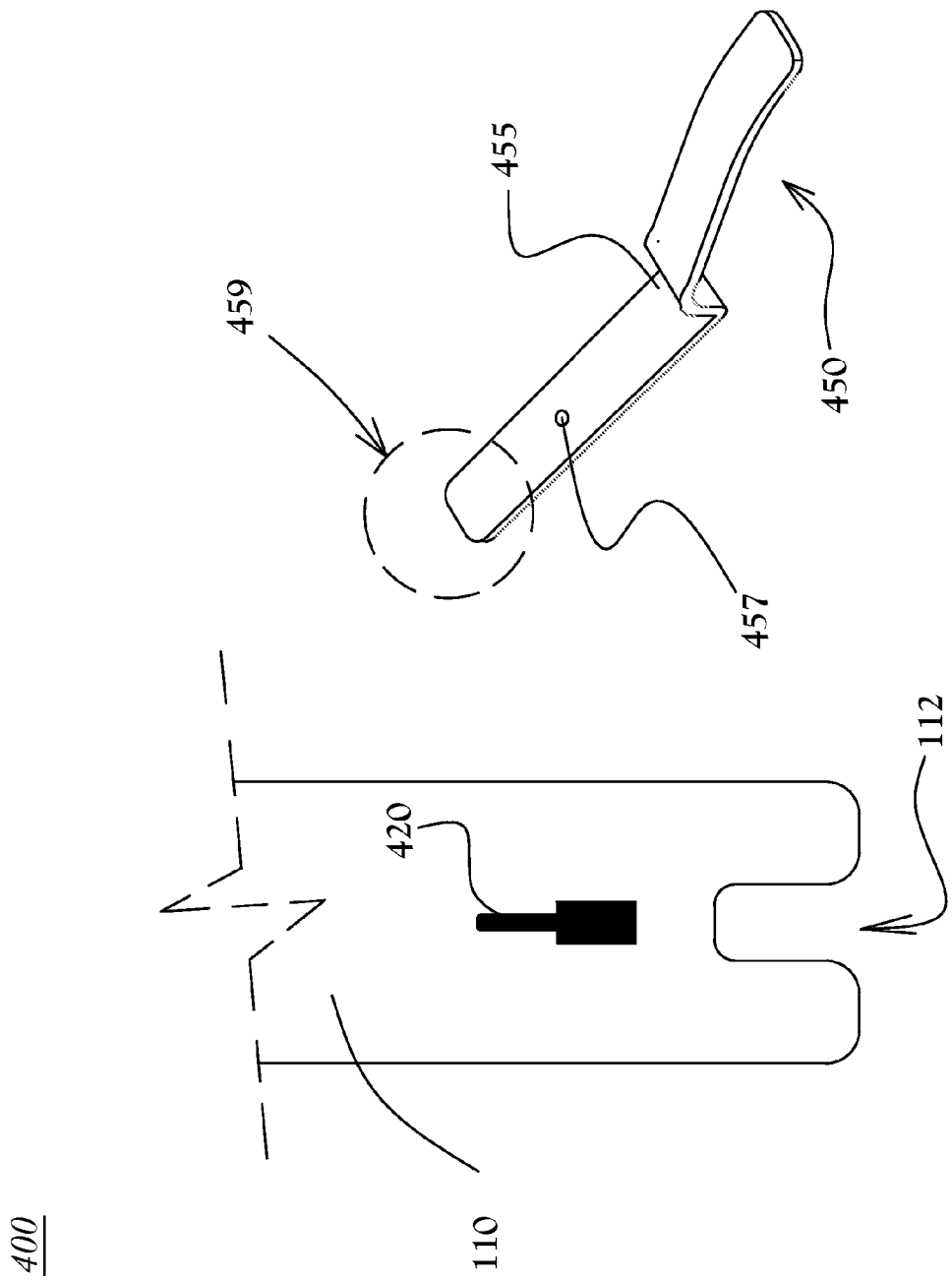
FIG. 4 is a generalized illustration of an embodiment of an exemplary adjustable rear wheel hood system with an alignment (or centering) feature.

FIG. 4 is a generalized illustration 400 of an embodiment of a rear wheel hood system where only a single hole 457 is used in flange 455 of fender 450 and an alignment (or centering) feature is disposed near/at the end 459 of flange 455. In this embodiment, fender 450 is still placed into rear wheel cutout 112 of deck 110, to "fit" with slot 420 and is tightened/secured to deck 110 with a securing mechanism (bolt, etc.). However, alignment (or centering) feature 459 provides the same or equivalent effect of having a second hole/fastening area, as used in the above embodiments. The slot 420 can be in an upper or bottom side of the deck 110, the image shown being applicable for either configuration. It is noted that slot 420 is shown here as having multiple widths, recognizing that a larger securing element (not shown) may be used at the larger width portion of slot 420 and a smaller securing element or alignment feature may be used at the smaller width portion of slot 420. Of course, while FIG. 4 only shows two widths, it is understood that more than two widths may be used, including tapering of the widths, and other variations without departing from the spirit and scope of this disclosure. In its simplest form, slot 420 may only have a single width.

Figure 5:
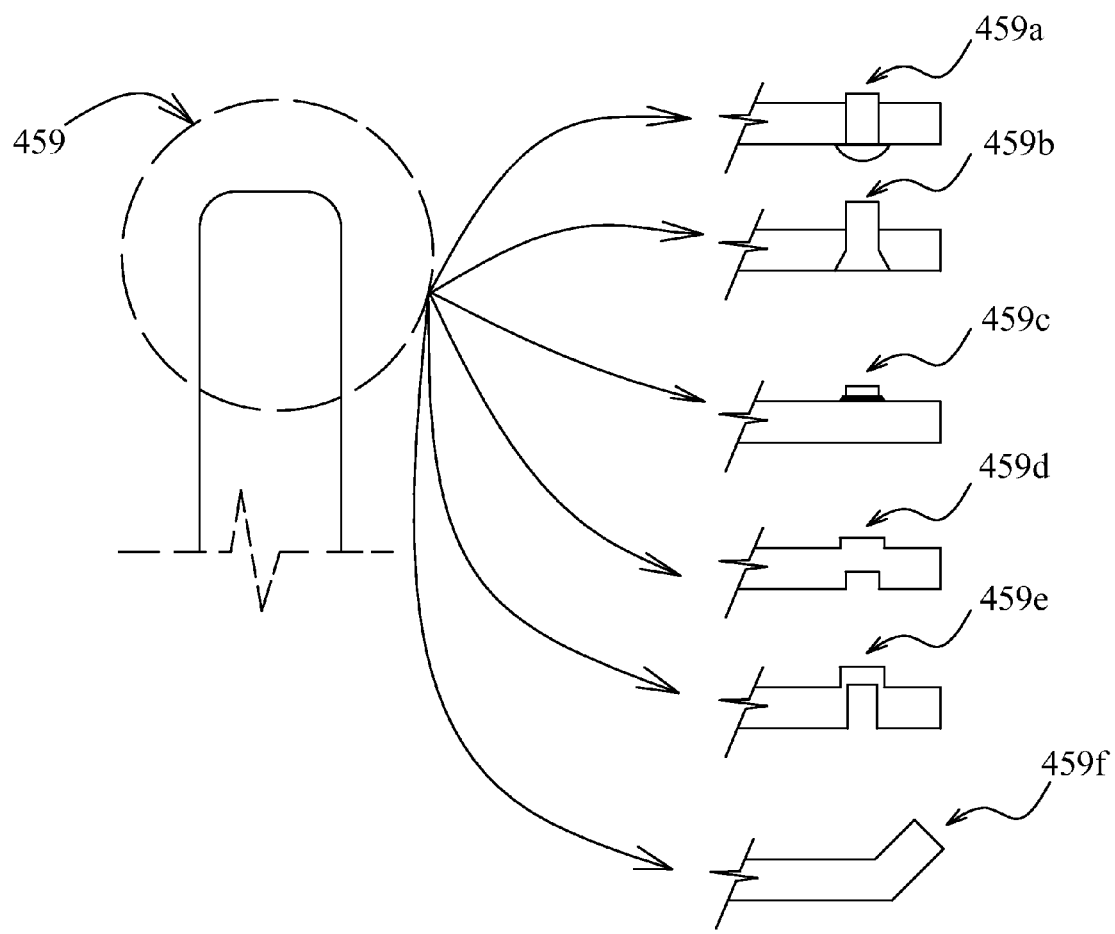
FIG. 5 is an illustration of various possible alignment (or centering) features for an exemplary adjustable rear wheel hood system.

FIG. 5 illustrates various possible alignment (or centering) features 459 for flange 455 of fender 450. The first alignment (or centering) feature 459a is a "secondary" hole but is fitted with a bolt, protuberance, or other piece that is hard-fixed to the hole in flange 455. Hard-fixing refers to making feature 459a a permanent (non-removable) element of the fender 450. Hard-fixing can be accomplished by welding, epoxying, soldering, etc. The first alignment (or centering) feature 459a is an upward protuberance from flange 455 and "fits" into slot 120, thus preventing fender 450 from moving laterally or rotating, when used in concert with a tightened/secured bolt (securing mechanism) in hole 457.

The second alignment (or centering) feature 459b is a "secondary" hole but is fitted with a screw, upward protuberance, or other piece that is press-fitted to the hole in flange 455. In this example, the press-fit secures the feature 459b from movement in flange 455.

The third alignment (or centering) feature 459c is a "holeless" feature where the upward protuberance is hard-fixed, via welding, epoxy, soldering, etc. to flange 455, effectively producing the same raised, slot-fitting element.

The fourth alignment (or centering) feature 459d is a "dimple" that is pressed into flange 455, resulting in a similar raised, slot-fitting element.

The fifth alignment (or centering) feature 459e is a dimple that is pressed further into flange 455, resulting in elevated ridge that leaves an opening or puncture in flange 455.

The sixth alignment (or centering) feature 459f can be a physical bending of the end of flange 455 to result in a bent tang, where the elevated portion fits into slot 120. Of course, depending on the width of fender 450, the end of fender 450 with alignment feature 459f may need to be tapered to "fit" within the slot 120.

As should be apparent to one of ordinary skill in the art, the above alignment features 459 can be configured to be non-circular, even rectangular, or any other desired shape, so as to better fit into slot 120, according to design preference. Additionally, a plurality of alignment features 459 may be used, if so desired.

Having understood the features described in FIGS. 4-5, it is apparent that a "swap" of alignment feature 459 can be achieved with hole 457 in flange 455, so hole 457 is located near the end of flange 455 and alignment feature 459 is located more interior to fender 450. Accordingly, it is understood that various modifications and changes may be made to the described embodiments by one of ordinary skill in the art, without departing from the spirit and scope of this disclosure.

Figure 6:
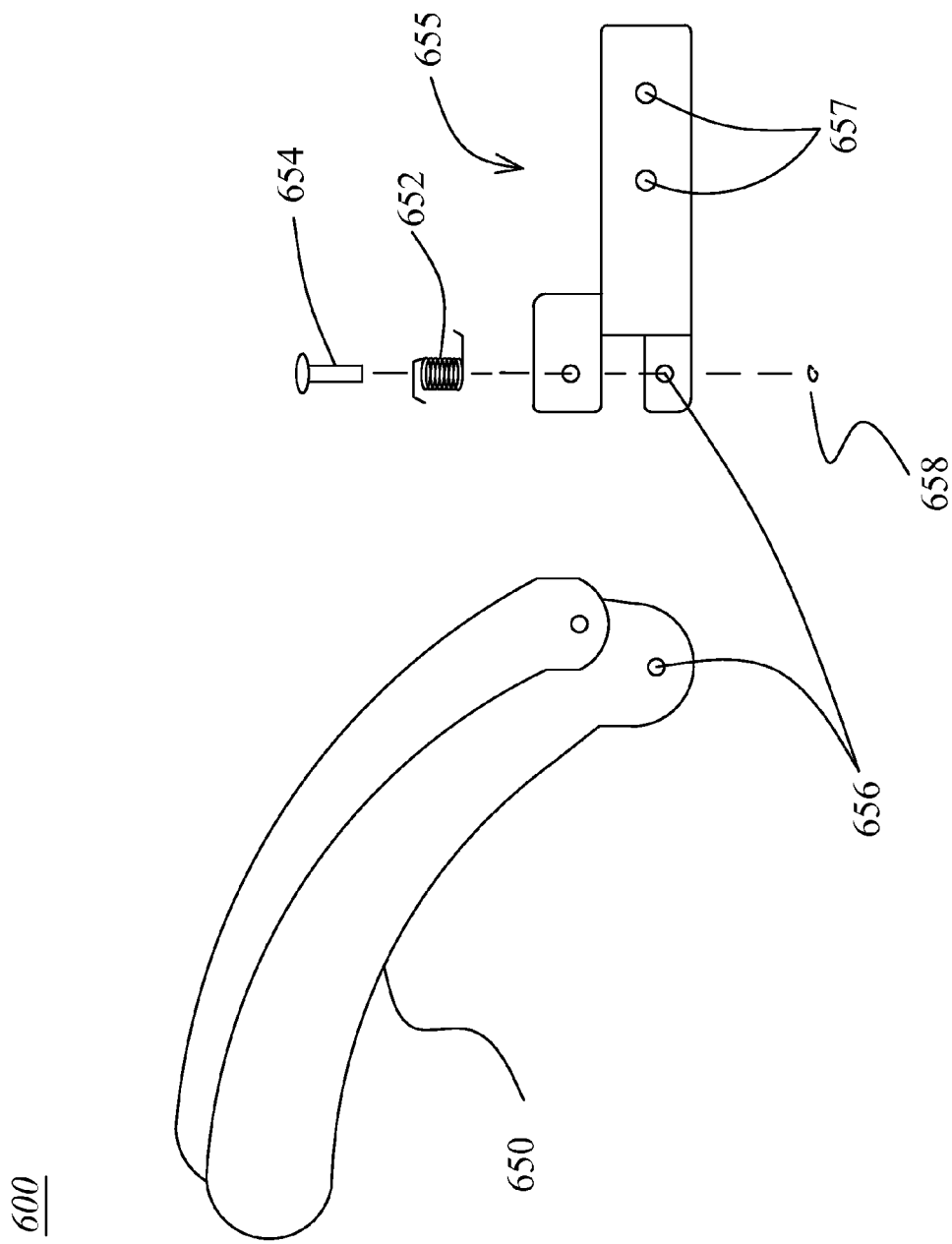
FIG. 6 is an illustration of another embodiment of an exemplary adjustable rear wheel hood system with a spring.

FIG. 6 is an illustration 600 of another embodiment of an adjustable rear wheel hood system, however, this embodiment utilizes a spring 662 to retain the static position of brake fender 650. Brake fender 650 and flange 655 are designed with holes 1066 that accommodate a pin 664 that fits through spring 662 (placed interior to flange 655), which is secured with pin retaining washer 668. Adjustment holes 657 are disposed in flange 655, to allow the assembly to be positioned at a desired location on a deck's slot, as described above. The ability to have a spring 662 enables a user to customize the push-back feel of the brake by simply changing out of the spring 662 with a different valued spring. Thus, in addition to having the ability to adjust the position of the exemplary rear wheel hood system on the deck, this embodiment allows customization of brake push tension.

Figure 7A:
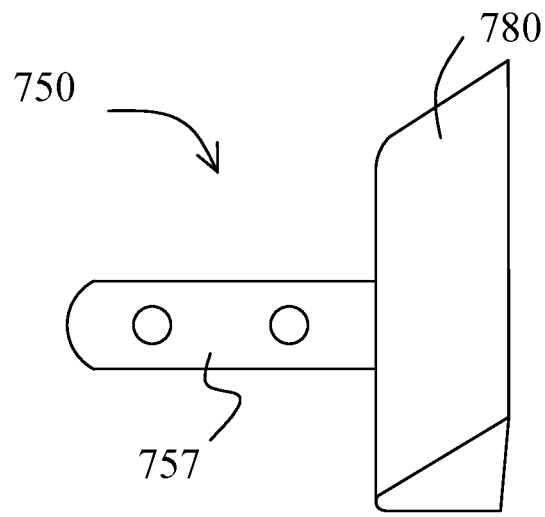
FIG. 7A is an illustration of an embodiment of an adjustable non-braking fender.

FIG. 7A is an illustration 700 of an embodiment of a rear wheel hood system with an adjustable non-braking fender 750 that can be implemented in lieu of the brake. Flange 757 contains the securing receptacle hole(s) described above for position adjustment, and the press plate 780 of adjustable non-braking fender 750 is shown here as a semi-triangular structure that covers the rear wheel (not shown), to prevent the rider from touching the rear wheel when attempting to do a wheelie with the scooter. The press plate 780 is configured with a sloped front end so that the rider can better exert an angular, tilting force to the back of the scooter, thus making wheelies much easier to achieve.

Figure 7B:
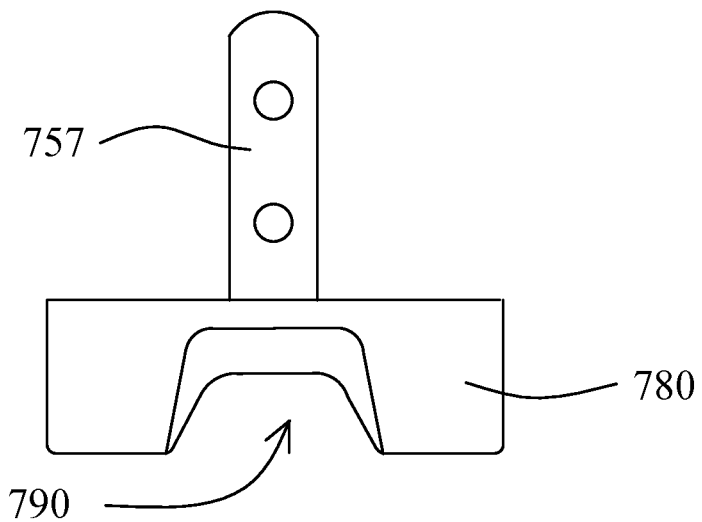
FIG. 7B is an illustration of a back view of adjustable non-braking fender.

FIG. 7B is an illustration of the back view of the embodiment of FIG. 7A, showing cutout 790 for accommodating the rear wheel (not shown). The width of adjustable non-braking fender 750 is typically set to approximately the deck width, but can be smaller or larger, depending on implementation preference. The adjustable non-braking fender 750 can be fabricated from welding several pieces of metal to form the press plate 780 and associated "triangular" assembly and attaching flange 757 to the bottom of it. Of course, depending on fabrication costs, the adjustable non-braking fender 750 can be constructed by other means such as casting, injection molding, 3D printing, forging, extrusion, etc. Therefore, other methods to arrive at the adjustable non-braking fender 750 can be implemented without departing from the spirit and scope of this disclosure.

It should be evident that all or some of elements of described in any of the above described embodiments can be fabricated from various metals, plastics, etc. For example, for lightness and durability, aluminum has been used in experimental embodiments, particularly for the fender/hood, while steel or other similar material was used for the securing mechanisms (for example, bolts). Any material that is resilient and durable can be used, according to design preference.

Figure 8:
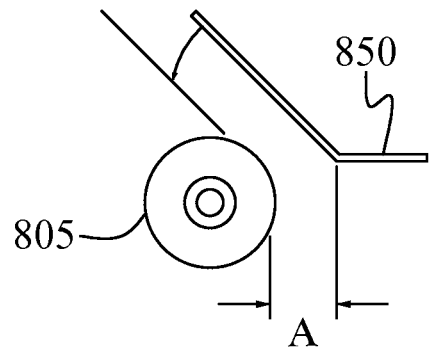
FIG. 8 is a series of illustrations showing relative separations from an adjustable fender and the rear wheel.
Figure 8:
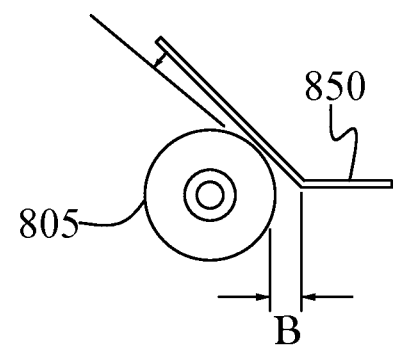
Figure 8:
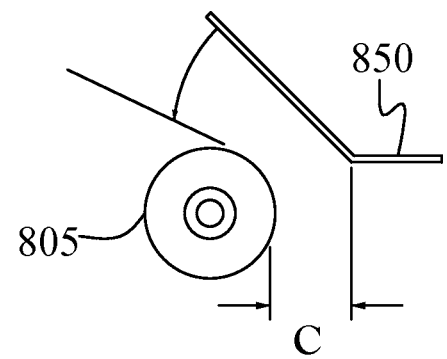

FIG. 8 is a series of illustrations showing relative separations from an adjustable fender 850 and the rear wheel 805, according to different positions. For example, for a given position, first illustration 810 shows a separation distance of "A" between the bend in adjustable fender 850 to the front of wheel 805. The second illustration 840 shows for a different position, a smaller separation distance of "B" between the bend in adjustable fender 850 to the front of wheel 805. The third illustration 870 shows for another position, a larger separation distance of "C" between the bend in adjustable fender 850 to the front of wheel 805. It should be understood from the above Figures that the separation distance also affects the location of the contact point between the fender 850 and the wheel 805 (for example, a higher separation results in the fender's 850 contact point to be higher on the fender 850 and similarly higher on the wheel 805; conversely, a smaller separation results in the fender's 850 contact point to be lower on the fender 850 and lower on the wheel 805). Further, understanding that metal or materials are more resilient at a bend, the separation distance inherently changes the amount of force and "distance" of force needed to apply to the fender 850. That is, less "force" but more distance of force is needed for a large separation.

It is expressly understood that while the above embodiments illustrate embodiments with two securing mechanism(s), less or even more securing mechanisms may be used according to design preference. Therefore, the present disclosure is not to be limited in terms of the particular embodiments described in this application, which are intended as illustrations of various aspects.

While various aspects and embodiments have been disclosed herein, other aspects and embodiments will be apparent to those skilled in the art. Accordingly, many modifications and variations can be made without departing from its scope, as will be apparent to those skilled in the art. Functionally equivalent methods and apparatuses within the scope of the disclosure, in addition to those enumerated herein, will also be apparent to those skilled in the art from the foregoing descriptions.

It is to be understood that this disclosure is not limited to particular methods, implementations, and realizations, which can, of course, vary. It is also to be understood that the terminology used herein is for the purpose of describing particular embodiments only, and is not intended to be limiting. Thus, the various aspects and embodiments disclosed herein are for purposes of illustration and are not intended to be limiting, as delimited by the appended claims.

What is claimed is:

1. A free style kick scooter adjustable rear wheel hood system, comprising:
   at least one securing mechanism;
   a free style kick scooter longitudinal deck having a longitudinally oriented slot accommodating a brake hood, the slot being longer than wider in size and having one or more widths along its longitudinal axis and disposed at a rear of the scooter deck; and
   wherein the brake hood is constructed of a resilient material, having a front end and a rear end, the rear end being elevated from the front end for application of braking force to a rear wheel when pressure is applied to a top side portion of the rear end, the front end having a plurality of longitudinally spaced securing receptacles to mate with the at least one securing mechanism,
   wherein the longitudinal slot facilitates adjustment of a mating position of the brake hood on the scooter deck to affect a braking response, and wherein the at least one securing mechanism, when mated and secured, prevent the brake hood from lateral and rotational movement on the scooter deck.

2. The adjustable rear wheel hood system of claim 1, wherein the plurality of longitudinally spaced securing receptacles are holes and the securing mechanisms are at least one of threaded bolts, washers, and nuts.

3. The adjustable rear wheel hood system of claim 2, wherein the holes are threaded.

4. The adjustable rear wheel hood system of claim 2, wherein the threaded bolts are permanently attached to the securing receptacles.

5. The adjustable rear wheel hood of claim 1, wherein the front end's plurality of longitudinally spaced securing receptacles are a first hole and an elevated protuberance, and the at least one securing mechanism is a threaded bolt fitting the first hole.

6. The adjustable rear wheel hood system of claim 5, wherein the elevated protuberance is a bolt threaded or welded to a second hole spaced from and longitudinally in line with the first hole.

7. The adjustable rear wheel hood system of claim 5, wherein the elevated protuberance is a rivet through a second hole spaced from and longitudinally in line with the first hole.

8. The adjustable rear wheel hood system of claim 5, wherein the elevated protuberance is a welded or glued pin spaced from and longitudinally in line with the first hole.

9. The adjustable rear wheel hood system of claim 5, wherein the elevated protuberance is a pressed or hammered dimple spaced from and longitudinally in line with the first hole.

10. The adjustable rear wheel hood system of claim 5, wherein the elevated protuberance is a pressed or hammered ridge spaced from and longitudinally in line with the first hole.

11. The adjustable rear wheel hood system of claim 5, wherein the elevated protuberance is a bent tang spaced from and longitudinally in line with the first hole.

12. The adjustable rear wheel hood of claim 1, further comprising a spring coupling the front end to the rear end, wherein the front and rear ends are separable pieces.

13. The adjustable rear wheel hood system of claim 1, wherein the rear end is not resilient and does not provide braking force to the rear wheel when pressure is applied to the top side portion of the rear end.

14. The adjustable rear wheel hood of system claim 13, wherein the rear end extends laterally to an approximate width of the scooter deck.

15. The adjustable rear wheel hood of system claim 14, wherein the rear end is shaped as a triangular wedge.

16. The adjustable rear wheel hood of system claim 14, wherein the rear end has a cutout to prevent touching the rear wheel.

17. The adjustable rear wheel hood of system claim 1, wherein the rear or the front end is formed using a casting, injection molding, 3D printing, forging, or extrusion technique.

18. The adjustable rear wheel hood system of claim 1, wherein the rear wheel brake hood is formed using a casting, injection molding, 3D printing, forging, or extrusion technique.

19. The adjustable rear wheel hood system of claim 1, wherein the longitudinal slot is disposed at a bottom surface of the deck.

20. The adjustable rear wheel hood system of claim 1, wherein the rear wheel brake hood is mounted to an interior surface of the deck.

\* \* \* \* \*